US010612828B1

(12) United States Patent
Engelbrect (10) Patent No.: US 10,612,828 B1
(45) Date of Patent: Apr. 7, 2020

(54) REMOVABLE SHELF SYSTEM FOR COOLERS

(71) Applicant: James Engelbrect, Edgewood, MD (US)

(72) Inventor: James Engelbrect, Edgewood, MD (US)

(*) Notice: Subject to any disclaimer, the term of this patent is extended or adjusted under 35 U.S.C. 154(b) by 0 days.

(21) Appl. No.: 16/223,310

(22) Filed: Dec. 18, 2018

(51) Int. Cl.
*F25D 3/06* (2006.01)
*F16M 11/38* (2006.01)
*F16M 11/32* (2006.01)

(52) U.S. Cl.
CPC ............... *F25D 3/06* (2013.01); *F16M 11/32* (2013.01); *F16M 11/38* (2013.01); *F16M 2200/025* (2013.01)

(58) Field of Classification Search
CPC .. F25D 3/06; F25D 3/08; F16M 11/32; F16M 11/38; F16M 2200/025
USPC ...................... 108/54.1, 117, 143, 24; 62/465
See application file for complete search history.

(56) References Cited

U.S. PATENT DOCUMENTS

| | | | | |
|---|---|---|---|---|
| 1,257,843 A | * | 2/1918 | Gonyea .................. | A47B 35/00 108/93 |
| 1,484,476 A | * | 2/1924 | Currie ..................... | F24B 1/205 248/439 |
| 2,652,300 A | * | 9/1953 | Graber ..................... | A47B 3/10 108/93 |
| 2,696,246 A | * | 12/1954 | Putnam ................. | B60N 2/2854 108/93 |
| 2,739,776 A | * | 3/1956 | Terando ............. | B65D 19/0093 108/54.1 |
| 2,745,705 A | * | 5/1956 | Morgan ................. | B60N 3/002 108/45 |
| 2,873,934 A | * | 2/1959 | Settles ............... | B65D 19/0097 108/54.1 |
| 2,942,827 A | * | 6/1960 | Edson ................ | B65D 19/0028 108/54.1 |
| 3,998,170 A | * | 12/1976 | Gordon .................. | A47B 45/00 108/91 |
| 4,200,346 A | * | 4/1980 | Belokin, Jr. ............. | A47F 3/00 206/518 |
| 4,286,525 A | * | 9/1981 | Willmore ................. | A47B 1/08 108/102 |
| 4,500,146 A | * | 2/1985 | Peterson ................ | A47B 45/00 108/102 |
| 5,052,185 A | | 10/1991 | Spahr | |
| 5,437,165 A | | 8/1995 | White | |
| 5,605,056 A | | 2/1997 | Brown | |
| 6,050,663 A | | 4/2000 | Schoellmann | |

(Continued)

FOREIGN PATENT DOCUMENTS

WO    2016115127    7/2016

*Primary Examiner* — Jose V Chen
(74) *Attorney, Agent, or Firm* — Kyle A. Fletcher, Esq.

(57) ABSTRACT

The removable shelf system for coolers is a shelf that keeps items elevated above the ice and melt water inside of a cooler. The removable shelf system for coolers comprises a horizontal frame elevated by four hinged legs. Two grates may be coupled to the frame and a third grate may be removably or hingedly coupled to the frame. The width and depth of the frame and the grates may be expanded or contracted to match the interior size of a cooler. The height of the shelf may be adjusted by expanding or contracting each of the four legs. Each leg comprises a twist-lock to lock and unlock the length.

16 Claims, 6 Drawing Sheets

(56) References Cited

U.S. PATENT DOCUMENTS

| | | | |
|---|---|---|---|
| 6,122,928 A * | 9/2000 | Strobel | B67D 1/0857 |
| | | | 222/146.6 |
| 6,126,124 A * | 10/2000 | Wagner | A45C 11/20 |
| | | | 248/127 |
| 6,626,006 B1 | 9/2003 | Tedder | |
| 6,763,959 B2 * | 7/2004 | Tedder | F25D 3/08 |
| | | | 211/153 |
| 6,877,826 B2 * | 4/2005 | Wood | A47B 45/00 |
| | | | 108/110 |
| 7,178,673 B1 | 2/2007 | Miller | |
| 7,313,928 B2 | 1/2008 | Girard | |
| 7,987,799 B2 * | 8/2011 | Lange | A47B 45/00 |
| | | | 108/102 |
| 8,065,889 B1 | 11/2011 | Silberman | |
| D785,411 S | 5/2017 | Kendrick | |
| 10,077,934 B1 * | 9/2018 | Dizon | F25D 25/005 |
| 2008/0066484 A1 * | 3/2008 | Blackstone | A41D 13/0053 |
| | | | 62/421 |
| 2008/0271468 A1 * | 11/2008 | Monroe | F24F 1/04 |
| | | | 62/89 |
| 2012/0047939 A1 * | 3/2012 | Junge | F25D 17/065 |
| | | | 62/441 |
| 2017/0023292 A1 | 1/2017 | Marinelli | |

* cited by examiner

REMOVABLE SHELF SYSTEM FOR COOLERS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of recreational equipment and food cooling systems, more specifically, a removable shelf system for coolers.

SUMMARY OF INVENTION

The removable shelf system for coolers is a shelf that keeps items elevated above the ice and melt water inside of a cooler. The removable shelf system for coolers comprises a horizontal frame elevated by four hinged legs. Two grates may be coupled to the frame and a third grate may be removably or hingedly coupled to the frame. The width and depth of the frame and the grates may be expanded or contracted to match the interior size of a cooler. The height of the shelf may be adjusted by expanding or contracting each of the four legs. Each leg comprises a twist-lock to lock and unlock the length.

An object of the invention is to provide a horizontal shelf for use in a cooler.

Another object of the invention is to provide depth and width adjustment for the frame of the shelf and for grates coupled to the frame.

A further object of the invention is to provide four hinged legs that comprise a twist-lock protected height adjustment.

Yet another object of the invention is to provide a grate that is removable or hinged to allow access to ice and beverages that are under the shelf.

These together with additional objects, features and advantages of the removable shelf system for coolers will be readily apparent to those of ordinary skill in the art upon reading the following detailed description of the presently preferred, but nonetheless illustrative, embodiments when taken in conjunction with the accompanying drawings.

In this respect, before explaining the current embodiments of the removable shelf system for coolers in detail, it is to be understood that the removable shelf system for coolers is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the removable shelf system for coolers.

It is therefore important that the claims be regarded as including such equivalent construction insofar as they do not depart from the spirit and scope of the removable shelf system for coolers. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Detailed reference will now be made to a first potential embodiment of the disclosure, which is illustrated in FIGS. 1 through 8.

The removable shelf system for coolers 100 (hereinafter invention) comprises a frame 200, a left front leg 241, a right front leg 242, a left rear leg 243, a right rear leg 244, a first grate 261, a second grate 262, and a third grate 263. The invention 100 is an insert for a cooler that elevates top shelf items to keep the top shelf items above ice, above bottom shelf items, and out of melt water. As non-limiting examples, the top shelf items may comprise meats, fruits, and vegetables and the bottom shelf items may comprise canned or bottled beverages.

The frame 200 may be a rigid or semi-rigid rectangular structure that is oriented to lie in a horizontal plane. The frame 200 may hold the first grate 261, the second grate 262, and the third grate 263 within the horizontal plane to form a shelf. The corners of the frame 200 may be hingedly coupled to the left front leg 241, the right front leg 242, the left rear leg 243, and the right rear leg 244.

The frame 200 may comprise the following components: a left front corner 202, a right front corner 204, a left rear corner 206, a right rear corner 208, a front lateral expander 210, a rear lateral expander 212, and a plurality of coupling components 220. The components of the frame 200 slidably couple to each other at a plurality of slidable couplings 230 in this order: the right front corner 204 to the right rear corner 208 to the rear lateral expander 212 to the left rear corner 206 to the left front corner 202 to the front lateral expander 210 to the right front corner 204.

Figure 7:
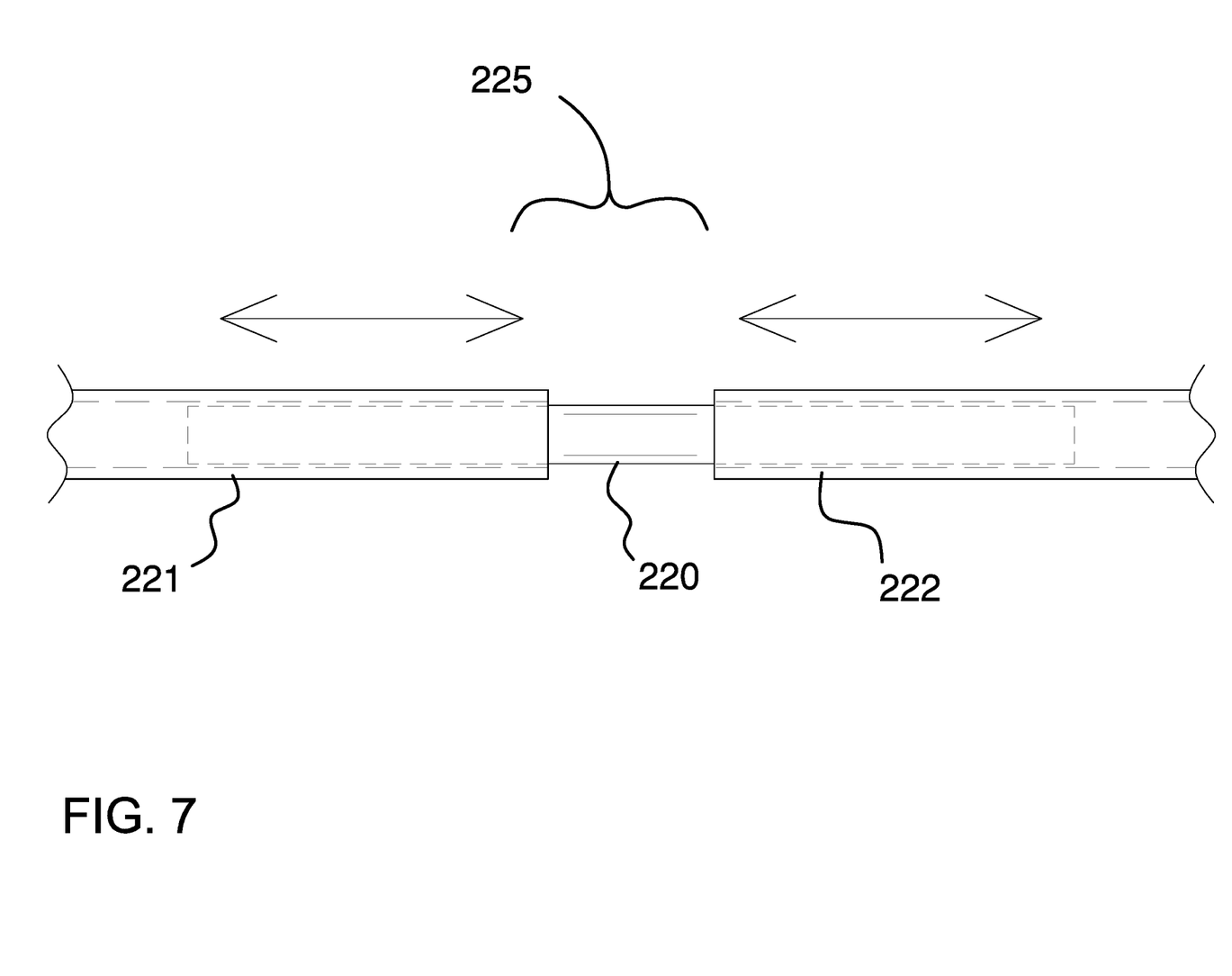
FIG. 7 is a detail view of an embodiment of the disclosure illustrating the area marked 7 in FIG. 3.

An individual slidable coupling 225 selected from the plurality of slidable couplings 230 may comprise a first outer component 221, a second outer component 222, and one of the plurality of coupling components 220. The first outer component 221 and the second outer component 222 may be hollow and may have the same inner diameter. The outer diameter of one of the plurality of coupling components 220 may match the inner diameter of the first outer component 221 and the second outer component 222 such that one of the plurality of coupling components 220 may slide in and out of the first outer component 221 and the second outer component 222.

As a non-limiting example, the first outer component 221 and the second outer component 222 may be the right front corner 204 and the right rear corner 208, or may other two components listed above as slidably coupling to each other.

The left front leg 241, the right front leg 242, the left rear leg 243, and the right rear leg 244 are uprights that support the frame 200 above the ice and the melt water. The left front leg 241 hingedly couples to the left front of the frame 200 via a left front hinge 250. The left front leg 241 may pivot between a vertical orientation and a horizontal orientation at the left front hinge 250. The left front leg 241 may pivot down and to the left to an upright position during use. The left front leg 241 may pivot up and to the right to a horizontal position adjacent to the frame 200 for storage.

The right front leg 242 hingedly couples to the right front of the frame 200 via a right front hinge 252. The right front leg 242 may pivot between a vertical orientation and a horizontal orientation at the right front hinge 252. The right front leg 242 may pivot down and to the right to an upright position during use. The right front leg 242 may pivot up and to the left to a horizontal position adjacent to the frame 200 for storage.

The left rear leg 243 hingedly couples to the left rear of the frame 200 via a left rear hinge 254. The left rear leg 243 may pivot between a vertical orientation and a horizontal orientation at the left rear hinge 254. The left rear leg 243 may pivot down and to the left to an upright position during use. The left rear leg 243 may pivot up and to the right to a horizontal position adjacent to the frame 200 for storage.

The right rear leg 244 hingedly couples to the right rear of the frame 200 via a right rear hinge 256. The right rear leg 244 may pivot between a vertical orientation and a horizontal orientation at the right rear hinge 256. The right rear leg 244 may pivot down and to the right to an upright position during use. The right rear leg 244 may pivot up and to the left to a horizontal position adjacent to the frame 200 for storage.

Figure 1:
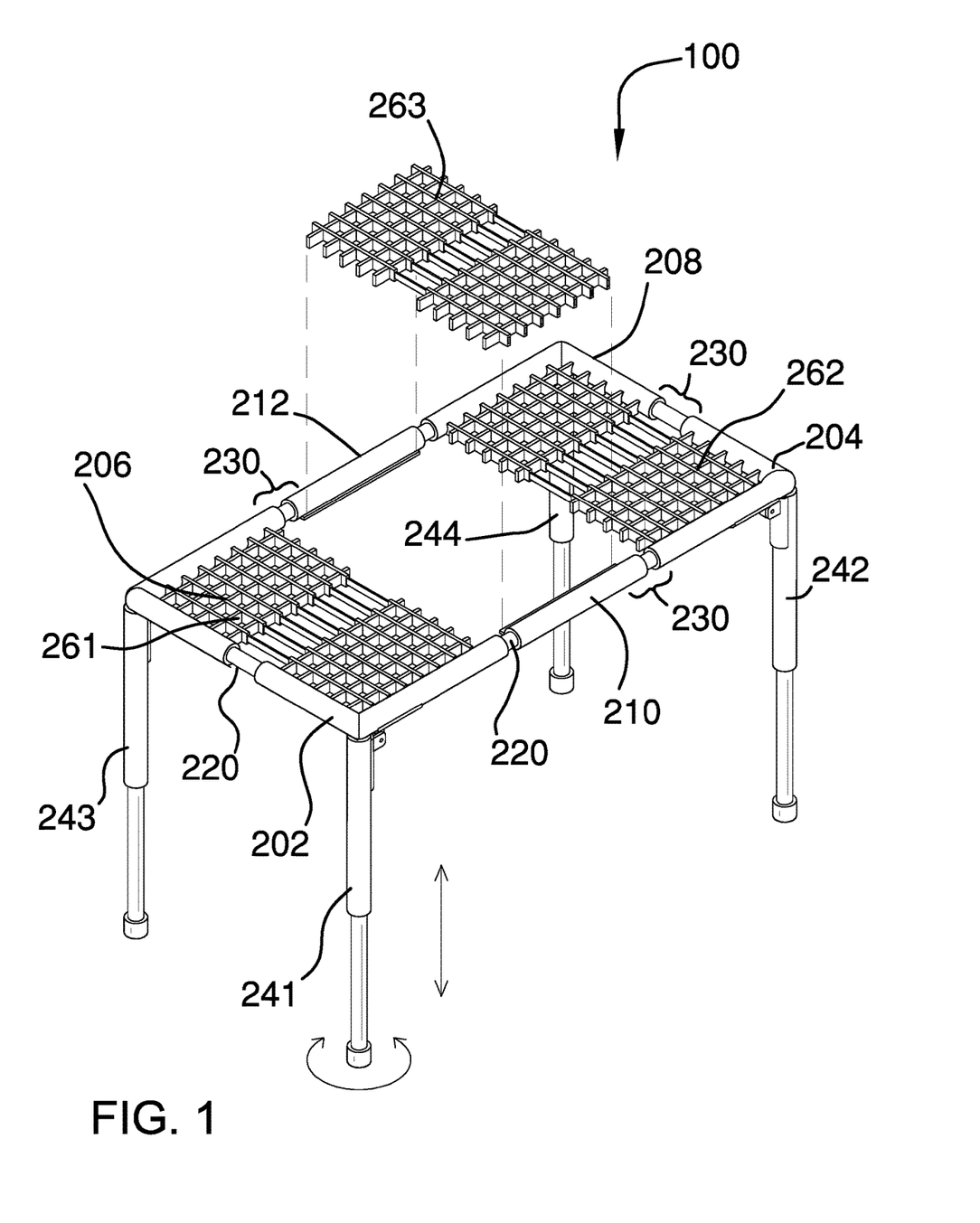
FIG. 1 is a perspective view of an embodiment of the disclosure.
Figure 2:
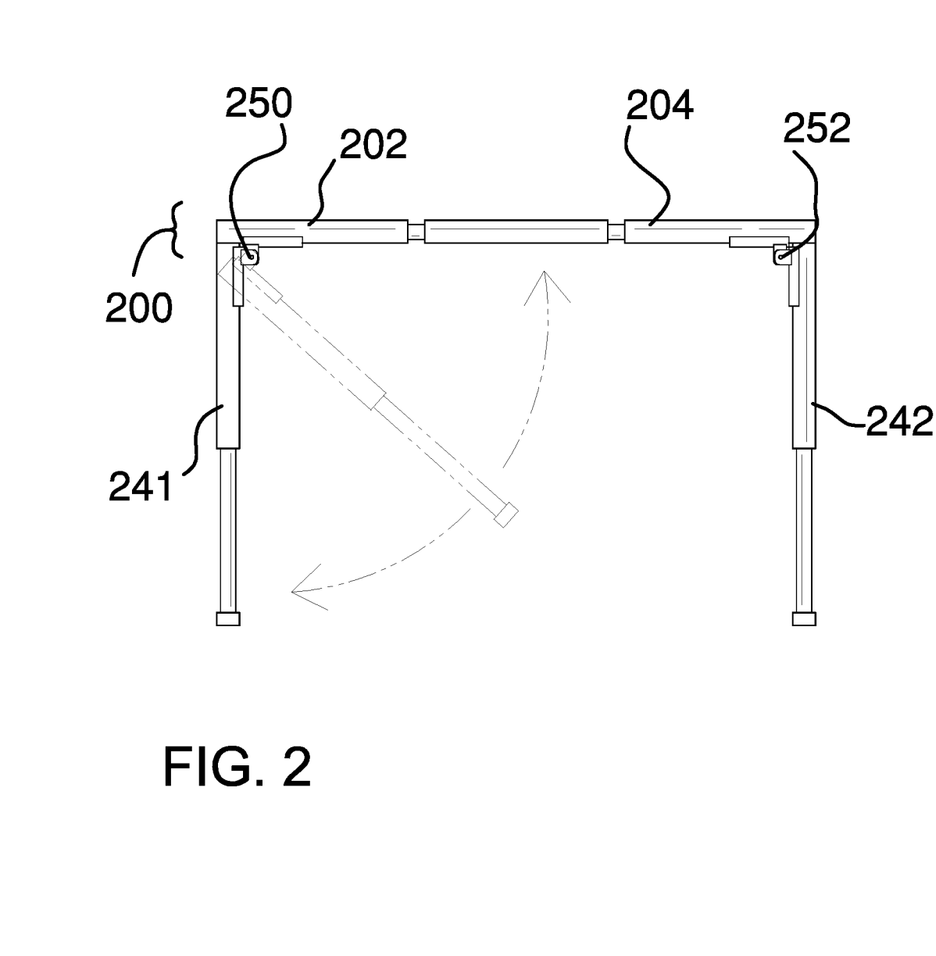
FIG. 2 is a front view of an embodiment of the disclosure.
Figure 3:
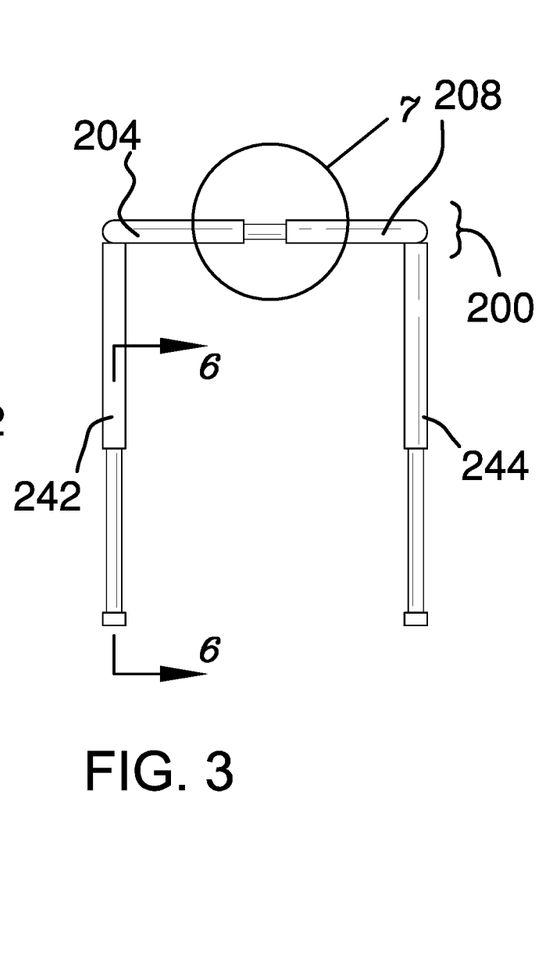
FIG. 3 is a side view of an embodiment of the disclosure.
Figure 4:
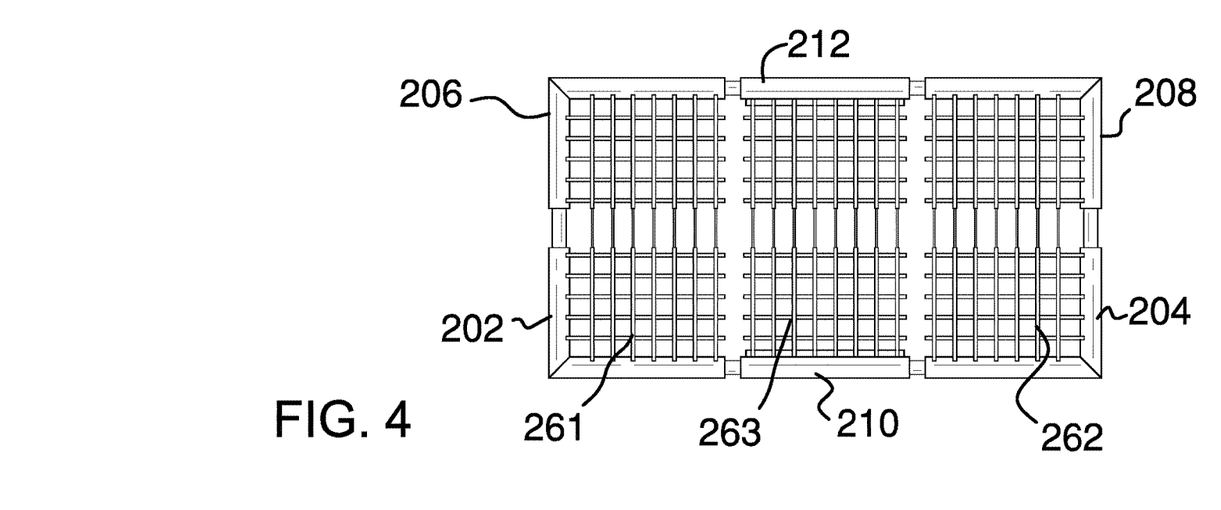
FIG. 4 is a top view of an embodiment of the disclosure.
Figure 5:
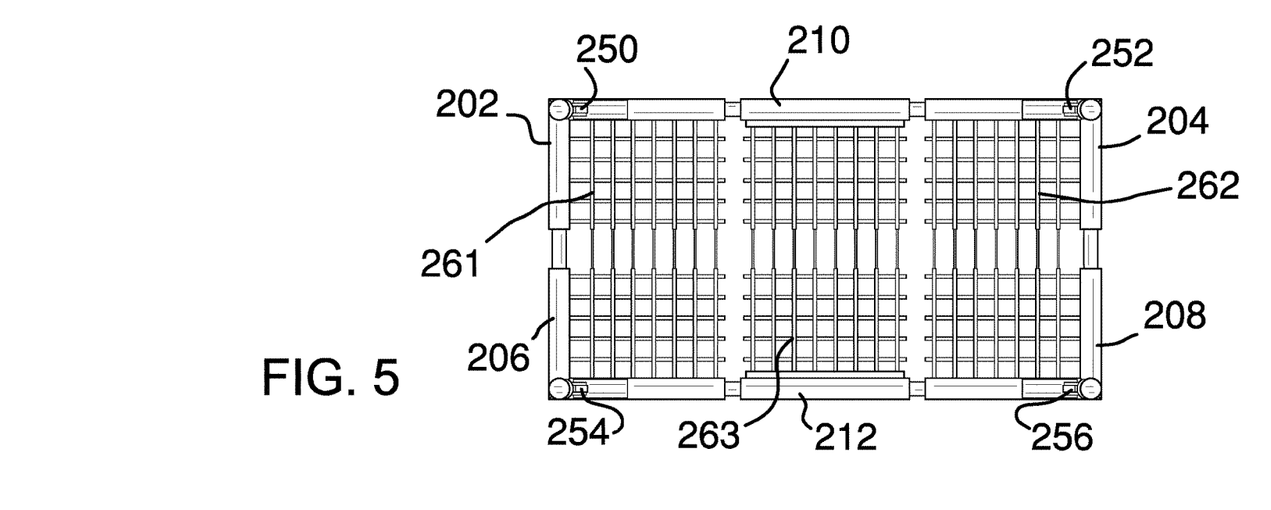
FIG. 5 is a bottom view of an embodiment of the disclosure.
Figure 6:
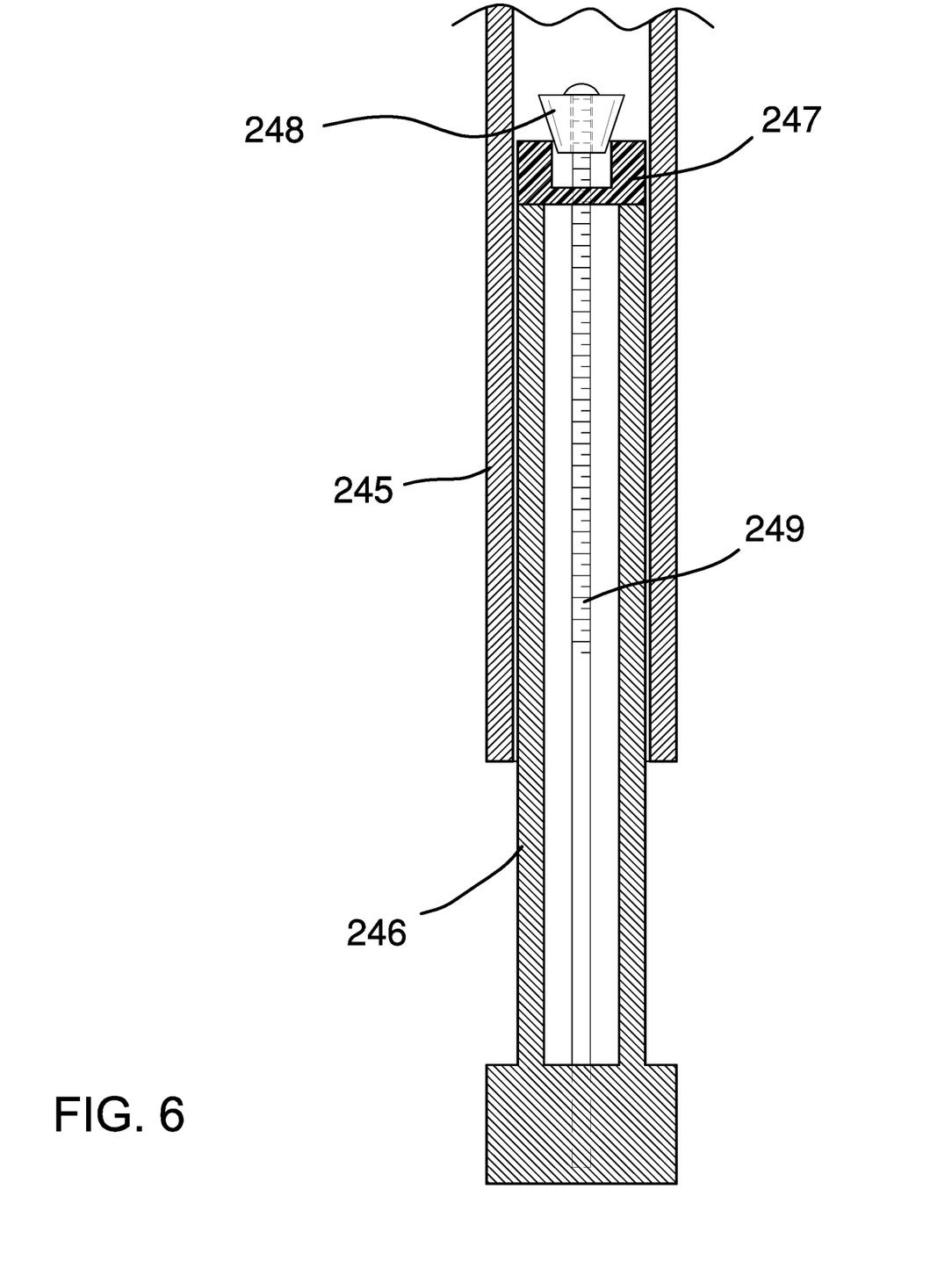
FIG. 6 is a cross-sectional view of an embodiment of the disclosure across 6-6 as shown in FIG. 3.

The height of an individual leg selected from the left front leg 241, the right front leg 242, the left rear leg 243, and the right rear leg 244 may be adjustable by twisting the bottom of the individual leg. As a non-limiting example, the individual leg may comprise an upper leg 245, a lower leg 246, a compressible ring 247, a spreader 248 and a threaded rod 249. The inside diameter of the upper leg 245 may match the outside diameter of the lower leg 246 such that the lower leg 246 may slide into and out of the upper leg 245. The top of the lower leg 246 may be coupled to the compressible ring 247. The threaded rod 249 may be coupled to the bottom of the lower leg 246 and may pass vertically up through the lower leg 246 and through the compressible ring 247. The spreader 248 may be located at the top of the threaded rod 249. The threaded rod 249 may pass through a threaded aperture in the spreader 248 such that rotation of the lower leg 246 may cause the spreader 248 to travel up or down on the threaded rod 249. The top of the threaded rod 249 may be flared or may comprise a head such that the spreader 248 is prevented from travelling off of the threaded rod 249. Rotation of the lower leg 246 in a clockwise direction may cause the spreader 248 to travel down the threaded rod 249. As the spreader 248 moves down the threaded rod 249, the spreader 248 may compress the compressible ring 247 and cause the compressible ring 247 to expand in a lateral direction, thus jamming the lower leg 246 against the upper leg 245 and preventing vertical movement of the lower leg 246 relative to the upper leg 245. Rotation of the lower leg 246 in a counter-clockwise direction may cause the spreader 248 to travel up the threaded rod 249. As the spreader 248 moves up the threaded rod 249, the spreader 248 may move away from the compressible ring 247 and the compressible ring 247 may decompress. As the compressible ring 247 decompresses, the compressible ring 247 may contract laterally thus freeing the lower leg 246 to move vertically relative to the upper leg 245.

The first grate 261 may be located on the left side of the frame 200. The first grate 261 may be coupled to the left front corner 202 and the left rear corner 206.

The second grate 262 may be located on the right side of the frame 200. The second grate 262 may be coupled to the right front corner 204 and the right rear corner 208.

The third grate 263 may be located at the center of the frame 200. The third grate 263 may be removably or hingedly coupled to the front lateral expander 210 and/or the rear lateral expander 212.

An individual grate selected from the first grate 261, the second grate 262, or the third grate 263 may be a plurality of front-to-rear bars 280 and a plurality of side-to-side bars 285 that are oriented perpendicular to each other. The individual grate may expand or contract along its front-to-rear dimension to conform to the front-to-rear dimension of the frame 200.

Figure 8:
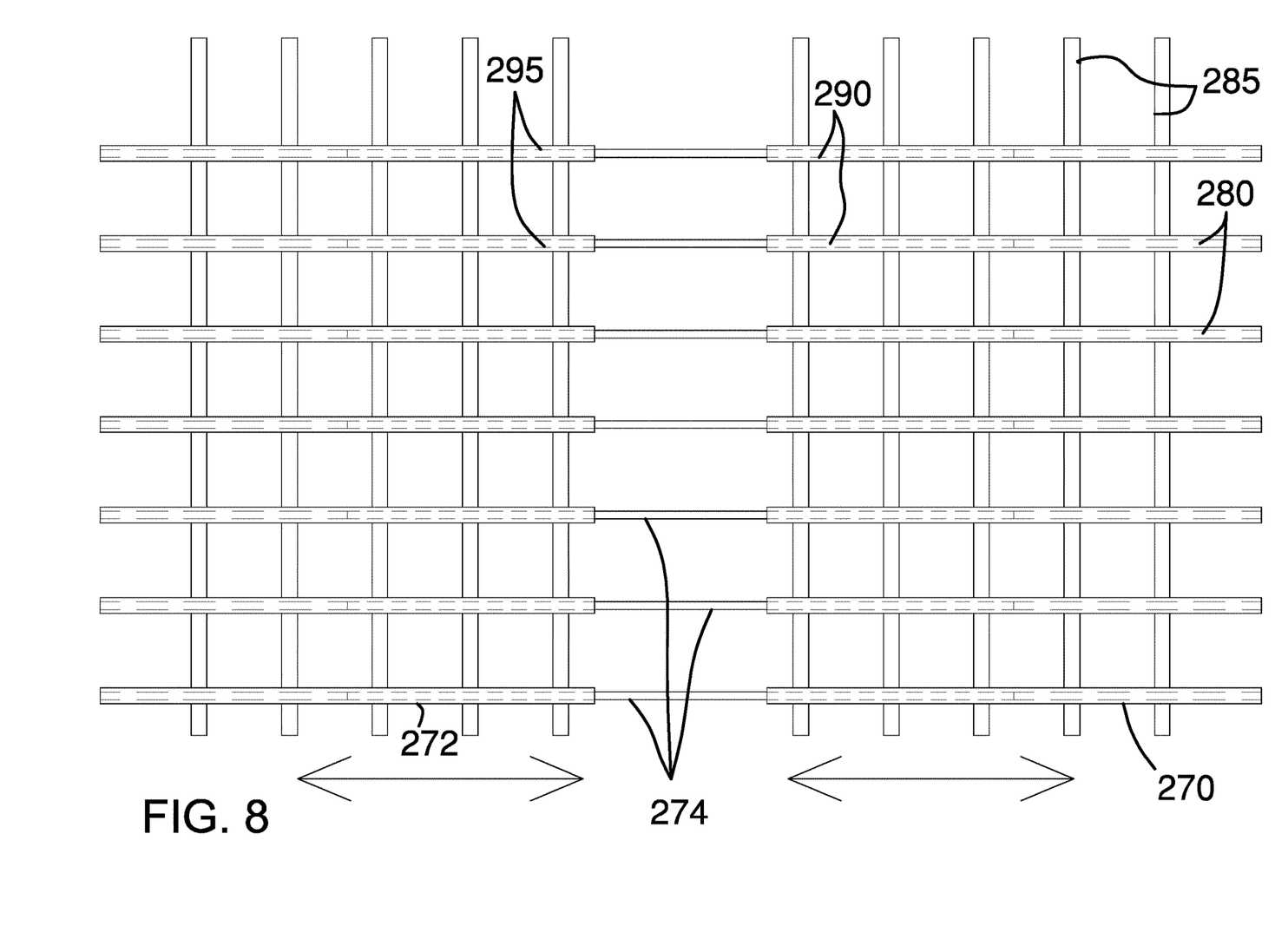
FIG. 8 is a detail view of an embodiment of the disclosure illustrating the expansion and contraction of a grate.

As a non-limiting example, the individual grate may comprise a front grate portion 270 and a rear grate portion 272 that are coupled via a plurality of grate adjusters 274. The front grate portion 270 may comprise a first plurality of front-to-rear bars 290 that are hollow and the rear grate portion 272 may comprise a second plurality of front-to-rear bars 295 that are hollow. The cross-section of the inside of both the first plurality of front-to-rear bars 290 and the second plurality of front-to-rear bars 295 may match the size and shape of the cross-section of the outside of the plurality of grate adjusters 274 such that the plurality of grate adjusters 274 may slide within the first plurality of front-to-rear bars 290 and within the second plurality of front-to-rear bars 295.

In some embodiments, the front lateral expander 210, the rear lateral expander 212, and the third grate 263 may be removed from the frame 200 to reduce the overall size of the invention 100.

The invention 100 may be resized to fit the side-to-side width and front-to-rear depth of the cooler by expanding or contracting the plurality of slidable couplings 230 on all four sides of the frame 200 and expanding or contracting the front-to-rear dimension of the first grate 261, the second grate 262, and the third grate 263. The invention 100 may be resized to fit the height of the cooler or to clear the ice or the bottom shelf items by loosening, sliding, and tightening each of the left front leg 241, the right front leg 242, the left rear leg 243, and the right rear leg 244.

In use, the left front leg 241, the right front leg 242, the left rear leg 243, and the right rear leg 244 are pivoted to their vertical positions, perpendicular to the frame 200. The height of each of the individual legs is adjusted by twisting the individual leg counter-clockwise to loosen the lower leg 246, sliding the lower leg 246 in or out of the upper leg 245, and then twisting the lower leg 246 clockwise to tighten it again. The front lateral expander 210, the rear lateral expander 212, and the third grate 263 may be inserted or removed based upon the size of the cooler. The plurality of slidable couplings 230 may be expanded or contracted to fill the horizontal cross-section of the cooler as viewed from above and the invention 100 may be placed into the cooler. To access the ice and the bottom shelf items, the third grate 263 may be lifted or pivoted to provide temporary access to the bottom of the cooler. The top shelf items may be placed upon the first grate 261, the second grate 262, and the third grate 263.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, an "aperture" is an opening in a surface. Aperture may be synonymous with hole, slit, crack, gap, slot, or opening.

In this disclosure, "compress" refers to forcing into a smaller space.

As used herein, the words "couple", "couples", "coupled" or "coupling", refer to connecting, either directly or indirectly, and does not necessarily imply a mechanical connection.

As used in this disclosure, a "cross-section" is a surface or shape that would be exposed by making a straight cut through an object.

As used in this disclosure, a "diameter" of an object is a straight line segment that passes through the center (or center axis) of an object. The line segment of the diameter is terminated at the perimeter or boundary of the object through which the line segment of the diameter runs.

As used herein, "front" indicates the side of an object that is closest to a forward direction of travel under normal use of the object or the side or part of an object that normally presents itself to view or that is normally used first. "Rear" or "back' refers to the side that is opposite the front.

As used in this disclosure, a "grate" is a plurality of parallel metal bars or a metal structure comprising a mesh structure formed from metal bars.

As used in this disclosure, a "hinge" is a device that permits the turning, rotating, or pivoting of a first object relative to a second object.

As used in this disclosure, "horizontal" is a directional term that refers to a direction that is perpendicular to the local force of gravity. Unless specifically noted in this disclosure, the horizontal direction is always perpendicular to the vertical direction.

As used herein, "inside diameter" or "inner diameter" refers to a measurement made on a hollow object. Specifically, the inside diameter is the distance from one inside wall to the opposite inside wall. If the object is round, then the inside diameter is a true diameter, however the term may also be used in connection with a square object in which case the inside diameter is simply the narrowest inside measurement that passes through the center of the object.

As used in this disclosure, the word "lateral" refers to the sides of an object or movement towards a side. Lateral directions are generally perpendicular to longitudinal directions. "Laterally" refers to movement in a lateral direction.

As used in this disclosure, "orientation" refers to the positioning and/or angular alignment of a first object relative to a second object or relative to a reference position or reference direction.

As used herein, "outside diameter" or "outer diameter" refers to a measurement made on an object. Specifically, the outside diameter is the distance from one point on the outside of the object to a point on the opposite side of the object along a line passing through the center of the object. The term outside diameter is frequently used in conjunction with round objects such as hollow conduits in which case the outside diameter is a true diameter, however the term may also be used in connection with a square object in which case the outside diameter is simply the widest outside measurement that passes through the center of the conduit.

As used herein, the word "pivot" is intended to include any mechanical arrangement that allows for rotational motion. Non-limiting examples of pivots may include hinges, holes, posts, dowels, pins, points, rods, shafts, balls, and sockets, either individually or in combination.

As used in this disclosure, "resilient" or "semi-rigid" refer to an object or material which will deform when a force is applied to it and which will return to its original shape when the deforming force is removed.

As used herein, "rigid" refers to an object or material which is inflexible. If a force is applied to a rigid object the rigid object does not bend or deform unless the force applied reaches the breaking point of the rigid object.

As used in this disclosure, "vertical" refers to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 8, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A removable shelf system for coolers comprising:

a frame, a left front leg, a right front leg, a left rear leg, a right rear leg, a first grate, a second grate, and a third grate;

wherein the removable shelf system for coolers is an insert for a cooler that elevates top shelf items to keep the top shelf items above ice, above bottom shelf items, and out of melt water;

wherein the frame is a rigid or semi-rigid rectangular structure that is oriented to lie in a horizontal plane;

wherein the frame holds the first grate, the second grate, and the third grate within the horizontal plane to form a shelf;

wherein the corners of the frame are hingedly coupled to the left front leg, the right front leg, the left rear leg, and the right rear leg;

wherein the frame comprises a left front corner, a right front corner, a left rear corner, a right rear corner, a front lateral expander, a rear lateral expander, and a plurality of coupling components;

wherein the components of the frame slidably couple to each other at a plurality of slidable couplings in this order: the right front corner to the right rear corner to the rear lateral expander to the left rear corner to the left front corner to the front lateral expander to the right front corner;

wherein an individual slidable coupling selected from the plurality of slidable couplings comprises a first outer component, a second outer component, and one of the plurality of coupling components;

wherein the first outer component and the second outer component are hollow and have the same inner diameter;

wherein the outer diameter of one of the plurality of coupling components matches the inner diameter of the first outer component and the second outer component such that one of the plurality of coupling components slides in and out of the first outer component and the second outer component.

2. The removable shelf system for coolers according to claim 1 wherein the left front leg, the right front leg, the left rear leg, and the right rear leg are uprights that support the frame above the ice and the melt water;

wherein the left front leg hingedly couples to the left front of the frame via a left front hinge;

wherein the left front leg pivots between a vertical orientation and a horizontal orientation at the left front hinge;

wherein the left front leg pivots down and to the left to an upright position during use;

wherein the left front leg pivots up and to the right to a horizontal position adjacent to the frame for storage.

3. The removable shelf system for coolers according to claim 2 wherein the right front leg hingedly couples to the right front of the frame via a right front hinge;

wherein the right front leg pivots between a vertical orientation and a horizontal orientation at the right front hinge;

wherein the right front leg pivots down and to the right to an upright position during use;

wherein the right front leg pivots up and to the left to a horizontal position adjacent to the frame for storage.

4. The removable shelf system for coolers according to claim 3 wherein the left rear leg hingedly couples to the left rear of the frame via a left rear hinge;

wherein the left rear leg pivots between a vertical orientation and a horizontal orientation at the left rear hinge;

wherein the left rear leg pivots down and to the left to an upright position during use;

wherein the left rear leg pivots up and to the right to a horizontal position adjacent to the frame for storage.

5. The removable shelf system for coolers according to claim 4 wherein the right rear leg hingedly couples to the right rear of the frame via a right rear hinge;

wherein the right rear leg pivots between a vertical orientation and a horizontal orientation at the right rear hinge;

wherein the right rear leg pivots down and to the right to an upright position during use;

wherein the right rear leg pivots up and to the left to a horizontal position adjacent to the frame for storage.

6. The removable shelf system for coolers according to claim 5 wherein the height of an individual leg selected from the left front leg, the right front leg, the left rear leg, and the right rear leg is adjustable by twisting the bottom of the individual leg;

wherein the individual leg comprises an upper leg, a lower leg, a compressible ring, a spreader and a threaded rod;

wherein the inside diameter of the upper leg matches the outside diameter of the lower leg such that the lower leg slides into and out of the upper leg.

7. The removable shelf system for coolers according to claim 6 wherein the top of the lower leg is coupled to the compressible ring;

wherein the threaded rod is coupled to the bottom of the lower leg and passes vertically up through the lower leg and through the compressible ring;

wherein the spreader is located at the top of the threaded rod;

wherein the threaded rod passes through a threaded aperture in the spreader such that rotation of the lower leg causes the spreader to travel up or down on the threaded rod;

wherein the top of the threaded rod is flared or comprises a head such that the spreader is prevented from travelling off of the threaded rod.

8. The removable shelf system for coolers according to claim 7 wherein rotation of the lower leg in a clockwise direction causes the spreader to travel down the threaded rod;

wherein as the spreader moves down the threaded rod, the spreader compresses the compressible ring and cause the compressible ring to expand in a lateral direction, thus jamming the lower leg against the upper leg and preventing vertical movement of the lower leg relative to the upper leg.

9. The removable shelf system for coolers according to claim 8 wherein rotation of the lower leg in a counter-clockwise direction causes the spreader to travel up the threaded rod;

wherein as the spreader moves up the threaded rod, the spreader moves away from the compressible ring and the compressible ring decompresses;

wherein as the compressible ring decompresses, the compressible ring contracts laterally thus freeing the lower leg to move vertically relative to the upper leg.

10. The removable shelf system for coolers according to claim 9
wherein the first grate is located on the left side of the frame;
wherein the first grate is coupled to the left front corner and the left rear corner.

11. The removable shelf system for coolers according to claim 10
wherein the second grate is located on the right side of the frame;
wherein the second grate is coupled to the right front corner and the right rear corner.

12. The removable shelf system for coolers according to claim 11
wherein the third grate is located at the center of the frame;
wherein the third grate is removably or hingedly coupled to the front lateral expander and/or the rear lateral expander.

13. The removable shelf system for coolers according to claim 12
wherein an individual grate selected from the first grate, the second grate, or the third grate comprises a plurality of front-to-rear bars and a plurality of side-to-side bars that are oriented perpendicular to each other;
wherein the individual grate expands or contracts along its front-to-rear dimension to conform to the front-to-rear dimension of the frame.

14. The removable shelf system for coolers according to claim 13
wherein the individual grate comprises a front grate portion and a rear grate portion that are coupled via a plurality of grate adjusters;
wherein the front grate portion comprises a first plurality of front-to-rear bars that are hollow;
wherein the rear grate portion comprises a second plurality of front-to-rear bars that are hollow;
wherein the cross-section of the inside of both the first plurality of front-to-rear bars and the second plurality of front-to-rear bars matches the size and shape of the cross-section of the outside of the plurality of grate adjusters such that the plurality of grate adjusters slide within the first plurality of front-to-rear bars and within the second plurality of front-to-rear bars.

15. The removable shelf system for coolers according to claim 14
wherein the front lateral expander, the rear lateral expander, and the third grate are removable from the frame to reduce the overall size of the removable shelf system for coolers.

16. The removable shelf system for coolers according to claim 14
wherein the removable shelf system for coolers is resized to fit the side-to-side width and front-to-rear depth of the cooler by expanding or contracting the plurality of slidable couplings on all four sides of the frame and expanding or contracting the front-to-rear dimension of the first grate, the second grate, and the third grate;
wherein the removable shelf system for coolers is resized to fit the height of the cooler by loosening, sliding, and tightening each of the left front leg, the right front leg, the left rear leg, and the right rear leg.

\* \* \* \* \*